United States Patent
Beser et al.

(10) Patent No.: US 7,865,916 B2
(45) Date of Patent: Jan. 4, 2011

(54) AUDIENCE DETERMINATION FOR MONETIZING DISPLAYABLE CONTENT

(76) Inventors: James Beser, 530 Rhode Island, San Francisco, CA (US) 94107; Jonathan A. Epstein, 2549 Post, #3, San Francisco, CA (US) 94115; Hillel S. Rom, 215 Ha-Giva Street, Beit Zait 90815 (IL); Ofer Rundstein, 37 Derech Hahoresh Street, Jerusalem 97278 (IL); Alexandre Sood, 221 27th Ave., Apt. 4, San Francisco, CA (US) 94121

( * ) Notice: Subject to any disclaimer, the term of this patent is extended or adjusted under 35 U.S.C. 154(b) by 441 days.

(21) Appl. No.: 11/971,838

(22) Filed: Jan. 9, 2008

(65) Prior Publication Data
US 2009/0025024 A1 Jan. 22, 2009

Related U.S. Application Data

(60) Provisional application No. 60/951,165, filed on Jul. 20, 2007, provisional application No. 60/956,837, filed on Aug. 20, 2007.

(51) Int. Cl.
H04H 60/56 (2008.01)
H04H 60/33 (2008.01)
(52) U.S. Cl. .................. 725/12; 725/34; 463/1; 705/14.69
(58) Field of Classification Search .......... 705/14.69
See application file for complete search history.

(56) References Cited

U.S. PATENT DOCUMENTS

| 7,559,834 | B1* | 7/2009 | York | 463/2 |
| 2002/0194590 | A1* | 12/2002 | Pong | 725/32 |
| 2003/0126013 | A1* | 7/2003 | Shand | 705/14 |
| 2005/0216932 | A1* | 9/2005 | Danker | 725/32 |
| 2007/0271518 | A1* | 11/2007 | Tischer et al. | 715/744 |
| 2007/0271580 | A1* | 11/2007 | Tischer et al. | 725/35 |

* cited by examiner

*Primary Examiner*—Andrew Y Koenig
*Assistant Examiner*—Jason Chung
(74) *Attorney, Agent, or Firm*—Connolly Bove Lodge & Hutz LLP; Jonathan A. Jaech

(57) ABSTRACT

The present disclosure relates to the measurement of the audience characteristics or demographics which is or can be exposed to displayed interactive content depicted on a screen. The audience can include persons who are engaged in interacting with the interactive content as well as persons who are observers of the interactive content and/or the active participants. The content can include one or more targeted advertisements contained in or associated with interactive content, and can be varied based on the audience characteristics or demographics. The audience characteristics or demographics can be used to accurately charge advertisers for the impressions created by the content displayed and can also or alternatively be used to determine and/or trigger what content is actually displayed.

10 Claims, 1 Drawing Sheet

AUDIENCE DETERMINATION FOR MONETIZING DISPLAYABLE CONTENT

CROSS-REFERENCE TO RELATED APPLICATION

This application claims priority pursuant to 35 U.S.C. §119(e) to U.S. provisional application Ser. No. 60/951,165, filed Jul. 20, 2007, which application is specifically incorporated herein, in its entirety, by reference; and to U.S. provisional patent application Ser. No. 60/956,837, filed Aug. 20, 2007, which application is also specifically incorporated herein, in its entirety, by reference.

BACKGROUND

1. Field

The present disclosure relates to the measurement of the audience which is or can be exposed to displayed interactive content.

2. Description of Related Art

For purposes of convenience, the present disclosure will be provided in the context of an interactive video game; this context for the description is not intended to limit the scope of the disclosure, rather it merely provides a common situation in which the disclosure can be easily described to and understood by one of ordinary skill in the art.

Providing interactive video content, for example interactive games on a computer, console or a receiver arranged to interact via a network (such as the internet), is known in the art. It is likewise known that such displayed content can be static or dynamic in nature. Displayed content includes, but is not limited to, video signal content displayed by the execution of console, portable PC and/or other forms of interactive video game software; content on a visual display product, whether the depiction is content provided directly (such as, without limitation, by streaming or by being connected to a common multi-player game site) or processed by a device (such as, without limitation, by a console, portable PC); or, other content that may be otherwise available for depiction.

The use of advertising or community messaging in the displayed content as part of an interactive presentation of video images (e.g., during game play) is a way to generate ongoing revenue by selling space to sponsors for ads displayed to an established base of game users, or by promoting other revenue-generating opportunities through game play. In addition, the value of a particular game may be enhanced by the addition of community features, such as achievements, tournaments, messaging, and other features that facilitate greater social interaction between remote game players. These features thus add to the interest level provided by game play, which, in turn, can increase the amount of game play and the duration for which user interest in the game is sustained, as well as attract new users.

Various techniques have been used to attempt to detect and/or estimate the presence and number of persons to whom advertisements are presented for viewing. For example, Bishop, Jr., et al. U.S. Pat. No. 4,853,678 discloses an advertising device using a passive infrared system to detect the presence of a shopper to trigger a light or sign to attract the attention of the shopper. Likewise, DiFranza et al. U.S. Pat. No. 6,962,240 discloses an information system with occupancy detector which detects and counts the presence of passengers who enter or exit from an elevator fitted with the advertising system described therein. None of these references, however, address the need to track the size of the audience for interactive advertising content which can be updated on a real time basis, including having the ability to select advertisements based on the size of the viewing audience.

It is desired, therefore, to overcome these and other limitations of the prior art, and to provide new methods, processes and systems that may be applied in new and unexpected ways to enhance user interest and participation in interactive content delivery.

SUMMARY

The present disclosure addresses methods, processes and systems for detecting the number of the interactive and inactive observers of the displayed video content, including advertising, as a tool to monetize such video content. Using the technology of the present disclosure, the audience characteristics or demographics (rather than merely the fact that an audience is present) can also serve as a factor and/or basis to select the content to display.

The methods, processes and systems of the present disclosure overcome shortcomings in the prior art in several ways. Depending on the needs of the content sponsor (e.g., an advertiser, the game publisher, the stream provider, or one or more other persons with control over the selection of displayed content or the rubric for selecting which content to display), the audience can be divided into multiple segments in any way that relates to the content sponsor's business needs or the audience's characteristics. Using the interactive video game example, the present disclosure discusses the audience in two segments, the active audience (also sometimes referred to as the interactive audience or the gamers) and the inactive audience, also referred to as spectators.

In one embodiment of the disclosure, the methods, processes and systems of the present technology include software, which is configured to utilize data from one or more peripheral devices that produce an output in response to persons actively participating with the interactive content, e.g., persons engaged in game play. These peripheral devices are preferably arranged to distinguish between persons sharing a common peripheral such as a controller. This allows for the size of the active audience to be accurately determined.

The presence and number of the inactive audience are likewise of interest. The presence and number of persons in the inactive audience can be sensed by using one or more peripheral devices to ascertain various attributes of the inactive audience. Inputs from peripherial devices can include, but are not limited to, cameras, motion detectors, microphones and/or cellular phone or other personal electronic device sensors.

Finally, the methods, processes and systems of the present disclosure can be used to ascertain data about the demographic characteristics of the inactive and active audiences, and employ that information in the monetization of the displayed content. For example, using SONAR, is it possible to determine body mass or other characteristic which can be used to indicate the gender composition of the audiences as well as their physical sizes. Other known methods of detection can provide relevant information (e.g., heart rate and pulse measurements). The technology of the present disclosure can be arranged to collect and use such is information to target audiences on characteristics beyond just the size or number of persons in the relevant audience.

The data collected by the technology of the present disclosure in this embodiment can permit the content sponsor to be accurately charged for the exposure of the content displayed based on the actual viewing audience based on the actual impressions for the advertisement with a level of precision heretofore unattained. This monetization can be based on data which is stored and used later, which is reported periodically, or which is acted upon concurrent with the execution of the game (for example in real time with game play).

In another embodiment of the disclosure, the methods, processes and systems of the methods, processes and systems of the present disclosure are also configured to provide graphical output for insertion into, or in place of, the output that might otherwise be depicted based on the composition or demographics of the audience present. By way of example, the software executable may be configured to cause specific defined output in response to input received during execution, directly or indirectly though the computer processor, based on the output of one or more peripheral devices to detect one or more segments of an audience for the displayed content. That input may be that the total audience is above a certain number of persons or the interactive audience is above a certain number of players. Upon receipt of this triggering input, the executable that provides the content (e.g., software associated with the game) will cause a selected advertisement to be inserted into the displayed content which is different from the advertisement or content that would be inserted if the audience characteristic was not present. This permits the audience characteristics or demographics to alternatively or concurrently be used to determine what content is actually displayed, including on a real time basis.

As persons of skill in the art will recognize, the methods, processes and systems disclosed herein have broad potential application such that this disclosure is not limited to advertising applications or either of these preferred embodiments. For example, and without limitation of the foregoing statement, persons of skill in the art will appreciate that in each of the embodiments, the software executable may be designed to operate in stand-alone mode, for example, to act on a client node without requiring real-time or near real-time communication with a remote node. Similarly, the software executable may also function in a networked multiplayer mode, in which real-time or near real-time communication is performed with one or more remote nodes.

The present technology provides novel methods, processes and systems to monetize the value of the content distributed with greater precision than the prior art. It further presents novel methods, processes and systems of distributing targeted content, including advertising and/or other information, in a game program. A more complete understanding of the present technology and methods will be afforded to those skilled in the art, as well as a realization of additional advantages and objects thereof, by a consideration of the following detailed description and the appended drawing.

DETAILED DESCRIPTION

Figure 1:
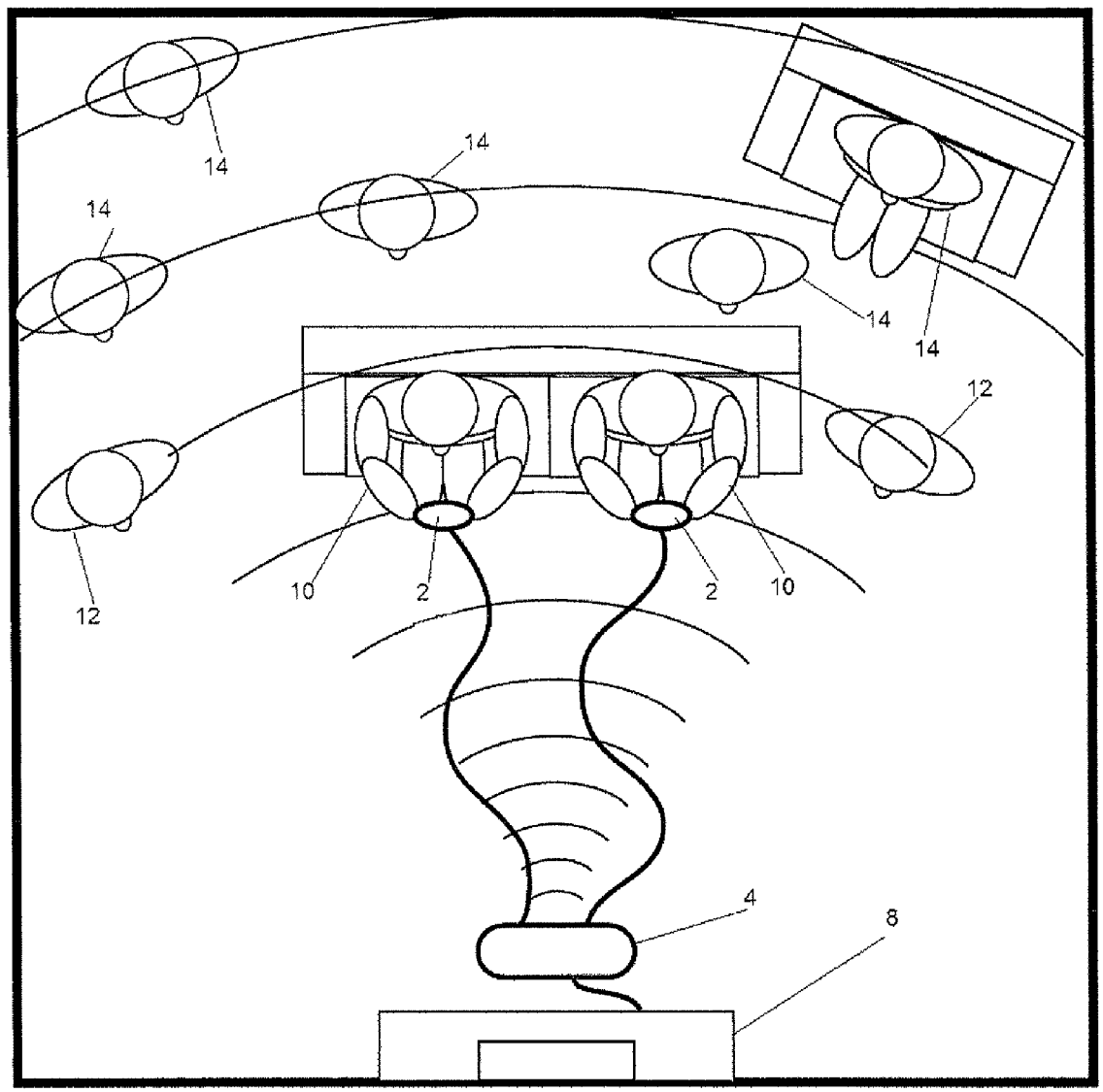
FIG. 1 is a diagram illustrating a typical environment where content is being depicted, an audience is present and the present technology can be deployed or used.

The present application describes novel features for accurately tracking audience characteristics or demographics, preferably for use with monetizing content displayed to the audience. This monetizing can take a variety of forms including, without limitation, the collection of audience size, composition, characteristics and/or demographic information for use in charging advertisers based on actual impressions rather than projected impressions and the insertion or substitution of content based on one or more attributes of the detected audience. The collection and/or insertions can occur on a real time basis or periodically, as may be appropriate or as the host system may support.

Advertisements in content distributed in fixed or changeable media, or via a communication network such as the internet, is a vastly growing field of increasing importance. As this field grows, it is desirable for content sponsors to be able to track the demographic profile and/or the number and types of persons who are exposed to the content. Likewise, it is highly desirable for the entities that sell and distribute the content to collect demographic information. This provides an enhanced opportunity to direct appropriate content and to charge proper rates for the delivered advertisements or other content, including, without limitation, the number of individuals who view any given advertisement in conjunction with the delivered content. The flexibility of matching the content or advertisements to the audience is a unique attribute of the present methods, processes and systems, and provides substantial advantages for the delivery of advertising messages in conjunction with displayed content.

Accurate tracking of the audience characteristics or demographics, as well as the ability to vary the displayed content based on those demographics presents a new and significant marketing channel. Content can be discretely targeted where appropriate or beneficial, and it can be modified as appropriate as one or more characteristics of the audience changes or is met. This permits advertisers and those associated with the submission, placement and management of advertising in the displayed content to sell advertising on a variety of metrics including based on packaging unique users (reach) who absorb discrete "impressions," much like Internet content in general.

The present description is presented for convenience in the context of an interactive video game or game executable. It should be apparent, however, that the concepts and technology described herein may be applied to other uses understood to one of ordinary skill in the art including those types of displayed content where the relationship between audience characteristics or demographics and the displayed content is significant and/or where the size of the audience can be used as a factor to vary the content actually displayed. The monetized content can be that created and delivered by use of software executables, by streaming content or other content delivery methods known to one of skill in the art to which the disclosed technology can apply. Games can be stand alone, multiplayer, networked or in an online environment. Content can include, but is not limited to, advertisements.

Using the example of a video game, as is illustrated in FIG. 1, the game is played using controllers 2 connected to a console 4 which displays the game graphics on a display screen 8. The active audience includes the participants 10 and any other competitors 12 in the interactive game. As used herein, the competitors are person who are actively involved in the activities of the game but are not the persons who are using a controller at all times. Competitors can include persons who are involved in the contest where only two persons can play at any one time but there are additional persons sharing one or more players such there is a total of 4 competitors.

FIG. 1 also illustrates persons who constitute an inactive audience 14 for the displayed content. The inactive audience can include, without limitation, the persons watching the content generally, those observing the active participants during their interaction with the content (e.g., during game play) and/or those other persons who are able to observe or hear the content presented and/or displayed but may be remote to the physical location of the displayed content.

Historically, persons selling advertising in the displayed content (such as video games) are permitted to count only the user who is playing the game in advertising reach calculations. There is no accounting for other advertising consumers who are, in fact, absorbing as much or more of the advertiser message as the individual gamers. These conventional estimates simply ignore the presence of multi-players and the inactive audience, as well as persons who might obtain the content by product pass-along.

Video game publishing is often marked by fierce competition. Given that audience reach is a primary advertising revenue driver, there is a need to more accurately measure the full audience for the displayed content—i.e., the full scope of the active audience of initial targets as well as the complete inactive audience of secondary targets. Indeed, this means that there is a need to measure the total exposure to the displayed content in the varied circumstances in which it can be present. One such need arises in the context of accurately measuring the exposure to the displayed content enabled with in-content advertising, including, without limitation, dynamic advertising and/or dynamic advertising technology and static advertising, particularly where the advertising can be and/or is updated from time to time.

Thus, looking at the illustrative gaming environment, it is clear that the audience is different from normal internet browsing, which is primarily a solitary exercise. Instead, gaming has a significant social aspect, as games are often played in 'multiplayer' mode and in front of a passive spectator audience. As illustrated in FIG. 1, the actual viewing audience for the displayed content, as well as the number of person exposed to the advertisements contained therein, can far exceed the number of units sold at retail, the number of registered users for the game or the number of users who have logged on to play the game.

The total audience is a highly relevant group of persons exposed to the displayed content for which present measurement is inadequate. This is particularly the case in the context of a video game where one group plays the game while other players take turns observing the play or awaiting their turn to play, and yet a third group of player guests can also be present and exposed to the content. Such circumstances are more prevalent as games and other types of displayed content have developed and develop in the future stunning graphics and a likeness to real-life.

Thus, it can be anticipated that there will be an inactive audience composed of persons who are exposed to the displayed content and who are not the initial target of the primary content (e.g., the engaged game players). While the inactive audience may be considered a secondary target for the primary display content, it can be as important as the primary audience for certain content, such as advertising content. The present embodiment of the technology envisions the ability to discern reliable information about the quantity of spectators and inactive exposure participants that comprise the inactive audience of this example, as well as those actively involved in the activity, such as the game players. This data can then be used and/or reported to others to assist in maximizing the targeting capabilities of this form of advertising.

There are many reasons why content suppliers such as an advertiser would want to reach, and why the content deliverer would want to reach and count secondary targets that are present in a gaming environment. For example, the fact that many people are watching the game, also strongly indicated that they are likewise absorbing the advertising. Thus, reach counting using established methods (which usually are focused on single basis tracking—i.e., tracking based on the assumption that a single exposure creates a single impression) drastically undervalues the medium as the true audience for the displayed content is much greater and thus creates much more than a single impression. Addressing this not only permits the true value of an advertisement to be recognized, it also permits a more granular targeting, based on audience characteristics or demographics, to be made.

This additional layer of granularity is very appealing for some advertisers. For instance, a marketer at a local pizzeria may be interested in targeting ads to a virtual football game being played with 10+ people present. The owner to the advertising rights in that game will want credit for exposing the advertisement to all 10+ of the recipients of the advertising message in this example.

The present technology enables alternative monetization methods by accurately tracking the audience for advertisements contained in interactive display content. This opens up content to value-add community features and alternative monetization options that may have otherwise been closed. The technology presented herein includes systems and methodology that harvests available information as inputs into a system to deduce the number of unique individual persons present at the time of, or just before, or for the duration of an ad exposure in a fixed media or variable media environment of the displayed content.

The methods, processes and systems disclosed herein will typically be utilized in, but not limited to, a software code of instructions that can be loaded or preloaded and/or stored in a manner that is accessible to the client side device that creates and/or scales the graphics that comprise the interactive content such as the video game output. The software may be based on an algorithm or other means of addressing the data inputs depending on the type and quality of the input. This information is preferably processed client-side and then transmitted to central servers where it can be aggregated across all instances of the content distributed (such as a game) to yield a total reach number. The processing can be done anywhere and the present disclosure is not limited to client side processing.

Looking first to the active participants, there are systems that are intended to register and/or capture information about the gamer (i.e., the initial target of the displayed content). For example, it is known to register the number of active controllers and vary the content (e.g., player names and numbers) based on the number of active controllers. But there are no systems that address how to capture information about the players (as opposed to the number of pieces of playing hardware like a controller) or how to capture to number of or register impressions by the other persons such as players in waiting who can be part of the total audience.

Thus, in looking at the gaming environment for illustration of the present disclosure, one must understand that the active audience can be comprised of a variety of persons, and is not limited to the number of active controllers. For example, it is possible that the controls are passed from one person to another who act as a virtual team even where the game or content is not segregated into separate players. Thus, if six men are playing in a 2-player mode but splitting levels or "sharing" lives, these players play in a single game session and the game system acts as if there are only two active players based on the two active controllers.

The system and methods of the present disclosure preferably senses information about the players using the playing hardware. This can be done by one of the several known methods of differentiating between successive persons using a single piece of hardware, such as comparing biometric measurements or finger prints. As a particular example, the controllers (also known as joysticks) may include sensors that are able to differentiate between users sharing a controller in a multiplayer game, or in a series of consecutive or concurrent multiplayer games, so that the true number of players can be ascertained with certainty. A software log on which players can be individually identified, including any referee or judge, might also be provided as an element of the game. This is one method of storing the data collected for subsequent use or identification of the number of players in a later and different session.

Alternatively, player differentiation can be achieved by tracking responses to a stimuli presented during game play, using one or more peripherals other than a single controller to interact with or manipulate the displayed content in any way and/or using multiple video game interface devices with embedded sensors.

Additional items that can be used to track the true number of players can include the actual number of active controllers as ascertained when the game code interfaces with the local operating system and, where multiple controllers are supported, the controllers should require explicit activation and turn off after a period of inactivity. The present technology can use this data and the input from a sensing means or the application of an algorithm to detect, with some acceptable confidence, that a controller (wireless or wired), has been activated by someone other than the Active User or primary gamer.

Microsoft's Xbox, Sony's PlayStation, Nintendo's Wii and some PCs each support several active controllers. The methods and system of the technology includes software, which is configured to track and/or store, and utilize data from one or more peripheral devices that produce an output in response to persons actively participating with the interactive content, e.g., persons engaged in game play. But there are additional members of the active audience that need to be counted.

Sensors can also be placed in the controllers which will ascertain when a person or group of persons is present, even if only one of the controllers is actively involved in interacting with the content. Such detection can be obtained from monitoring the active use of the controller (e.g., the controller starts moving around, the presence of heat from a hand, etc.). Likewise, if a controller is passed from player to player during a present session, the controllers will discern that different individuals are in contact with the controllers and thus report that there were more than 2 people viewing the displayed content even if it was depicted during a time when only 2 controllers were active. These inputs can be used by the methods, processes and systems of the present disclosure to ascertain the number of persons to be included in the active audience portion of the total audience, since they receive impressions from the displayed content. Thus, the methods, processes and systems of the present disclosure permit the audience to be counted with greater accuracy than previously allowed so as to ascertain the true reach of the displayed content.

The technology of the present disclosure also allows for the identification of non-player members of the audience (the spectators or inactive audience) and counted towards a particular advertising campaign. The preferred methods to detect the inactive audience includes the use of data from one or more smart peripherals positioned in the area where the content is being displayed and the inactive audience is located. The peripherals can be mounted in the environment and/or embedded in the console or PC or similar product. The peripherals are preferably arranged to sense the presence and number of the inactive audience. This is represented illustratively as the series of concentric semi-circles in FIG. 1. The software may additionally or alternatively be encoded to receive signals from one or more peripheral devices arranged to detect the number of persons within a predetermined range of the display. The detection range can be varied depending on the size and resolution of the display by using the EDID data that is transmitted between the display and the graphics device in the operating hardware environment.

The data about the presence and size of the inactive audience can be obtained in a variety of ways which allow for the determination of the number of distinct humans in the confined space around where the content was displayed. Examples of peripherals can range from PlayStation Eye, voice recognition devices (number of unique voice frequencies detected via a microphone array) to one or more cameras that capture photographic images that the system can process into an audience count and/or which capture the scattering of variable light frequencies (including infra-red) to determine the presence and number of persons present in the audience.

Alternatively, the peripherals can include devices to determine the presence and extent of the audience includes sensing the presence and number of eyes focused on the screen on which the content is displayed, sensing elevated heart-rates or respiration rates sensing different voices above a predetermined decibel level or tallying discernable speech patterns, each of which can be appropriate paradigms for locating and measuring the presence and population of the audience. Likewise, input information can be collected from motion sensor(s), heat sensor(s), sensors that recognize RF emitters such as cell phones, handheld devices, PDAs, etc., brain pattern monitors, RADAR or related technologies, sound wave detection devices that, for example, could detect the differing heartbeats of people in the room, discounting for other mammals' heart rate patterns, sensors to check the different breathing sounds of individuals, etc., SONAR sensors to check body position relative to the screen and thus decide whether someone was "watching", and other similar types of sensors known to persons of skill in the art that allow for the determination of the presence and number of persons in the area. The list of peripherals contained herein is not intended to be limiting of the technology, which includes all other means and/or combinations known to one of skill in the art, each of which is intended to be incorporated into this patent application.

Similarly, it is possible to use peripheral devices to collect information about other attributes of the active and inactive audiences, including certain demographic information. For example, using SONAR, is it possible to determine body mass or other audience characteristics. Other known methods of detection can provide relevant information (e.g., heart rate, respiration and pulse measurements) that can be correlated to demographic attributes of the audience. These peripheral inputs can be used to indicate the gender composition of the audiences, the range of physical sizes of the persons in one or both of the active and inactive audiences and/or the age of the members of these audiences. Of course, other demographic or characteristic information about these audiences can likewise be sensed or ascertained from the inputs received, as the above list is merely illustrative. Thus, the methods, systems and processes of the present disclosure can be arranged to collect and use such is information to target audiences based on characteristics beyond just the size or number of persons in the relevant audience.

Benefits from the system and technology of the present disclosure are not limited to the advertisers, streamers or content suppliers. Consumers will benefit as it will permit them to receive information more likely to be of interest to the particular situation presented, and to avoid being subjected to advertisements that have no relationship to the exposed consumers. Likewise, consumers will benefit from the information feedback received by the content sponsor from the technology of this disclosure, thereby improving the product with updates, patches, augmentations or present and future versions of the product. These benefits, among others, should motivate consumers to allow more extensive detection devices in their areas for viewing displayed content for the same reasons as persons presently permit the detection of television viewing (though commercial services such as Neilson) to ascertain viewing habits and ratings.

The second embodiment of the present methods and system of the technology of this description also preferable includes a software code of the types described above. The methods and system of the technology of the present disclosure will receive one or more inputs relating to the presence and/or size of the audience for the displayed content. Upon receipt of that input, the software is arranged such that it can modify the output of the content that would otherwise be displayed if the input signals that a certain condition is met.

Advertising can be inserted during the depiction of the displayed content by including the capability to call advertising material from a designated source during game play, so that the advertising appears during play of the video game. For example, advertising may be made to appear on a modeled billboard that is present in a modeled video game environment. The advertising content may be called at execution from a designated, updateable source and may therefore be updated after the game program is distributed. One example of such a system is described in pending U.S. patent application Ser. No. 11/281,834 entitled "Dynamic Advertising System for Interactive Games," the contents of which is incorporated herein by reference.

Similarly, it is possible to update and/or insert new additional content (including advertising content) into a previously released executable title. This is done by having a second executable software configured with a first executable software, such as a computer game, that monitors events on a client operating the first executable. The second executable determines actions to be performed in response to monitored events, as defined by a business logic table. The second executable traps API calls to perform actions altering apparent output of the first executable. The business logic table may be distributed to the client separately. The second executable and the first executable may be combined in a single file. The second executable may be used to provide additional content, including advertising, in the context of an existing game or other software executable. The technology is described more fully in the incorporated U.S. provisional patent application Ser. No. 60/956,837, filed Aug. 20, 2007.

Again by way of example, the software of this embodiment is arranged so as to provide a particular advertisement into the game display. Upon receipt of a signal that the audience characteristics or demographics is above a set threshold level, however, the software replaces the normally appearing advertisement with a different advertisement intended to target an audience of a particular size. Alternatively, where the methods, processes and systems of the present disclosure tracks the demographics of the audience and can ascertain that a particular audience characteristic is present, the software of this second embodiment can be used to insert content that is targeted to that audience demographic. Such characteristics can include, without limitation, the size of the audience, the gender mix of the audience, the age of the audience, the degree of audience interaction exhibited by the audience, or any combination of the foregoing or any other characteristic of one or both of the audiences that a particular advertiser or content sponsor wishes to use as a trigger to the depiction (or reservation) of particular content.

The methods and system of the technology can alternatively or additionally be deployed to insert particular targeted actions (such as change the outcome of the game play or cause a particular result or happening to occur, or otherwise modify the game content) based on one or more characteristics of the audience, including, without limitation, the presence of an audience of a particular size and/or the composition or demographic of persons in one or both of the active and inactive audiences. Thus, the software can be set to react in a multitude of ways depending on the distribution of demographics of the active audience, the inactive audience or a combination of the two.

Using the methods, processes and systems disclosed herein allows for the placement and definition of advertising, sponsorship or community functionality to be added and/or changed at any time and for any game, even after it has been downloaded and played by the end user, according to any business needs of the moment based on the audience population. Changes in the content (e.g., the launching of an advertising campaign) may be implemented as often as the audience characteristics are present and as business needs arise. Indeed, this technology allows the content sponsor (e.g., the advertiser) to make the business decision of which advertising features to deploy in a particular game according to the audience present coupled with the advertiser's demands on that day.

The methods, processes and systems disclosed are not limited to full data capture but can also be focused on a solution which measures impressions on a broader scale to track and correlate audience reactions to the content or other more comprehensive data that can come from the traditional set up for measuring audience metrics like that associated with television viewing. Applicant intends to capture all such systems known to one of skill in the art as available for use with, or as part of, the methods, processes and systems of the present disclosure.

The disclosure contained herein is intended to illuminate the scope of the description rather than limit the methods, processes and systems disclosed herein. The scope of the methods, processes and systems disclosed are not intended to be limited other than by the claims appended hereto.

What is claimed is:

1. A method for supplying advertising in association with interactive video content including a series of video images and associated audio content, comprising:

detecting, during a presentation of the video images on a display device and using at least a first sensor in communication with a processor, a first number of persons who are actively using a second number of input devices to interact with the interactive video content via an interactive video controller controlling video input to the display device, wherein the first number is detected independently of the second number;

detecting, during the presentation of the video images and using at least a second sensor in communication with the processor, a third number of persons who are inactively exposed to the interactive video content presented on the display device, exclusive of the first number of persons;

reporting, during the presentation of the video images, the first and third numbers of persons who are exposed to the interactive content; and, storing results of said reporting in a computer memory for use at a future time.

2. The method of claim 1, further comprising selecting further video content to be presented on the display device in response to the first and third numbers of persons who are exposed to the interactive content as reported during the presentation of the video images.

3. The method of claim 2, wherein the further video content selected for display comprises at least one advertisement for which an established condition of a minimum number of persons exposed to the content exists and said reporting confirmed that the condition was met during the presentation of the video content by a sum of the first and third numbers of persons.

4. The method of claim 1, wherein the results are used as a basis to determine an advertising charge based exclusively on the first number of persons.

5. The method of claim 1, wherein the reporting of persons exposed to the interactive video content includes a report of the first number of persons and the third number of persons.

6. A method of advertising during the presentation of interactive video content comprising:
   inserting an advertisement into a presentation of interactive video content on a display device, using an interactive video controller controlling output of video to the display device,
   detecting, during the presentation of the video images and using at least a first sensor in communication with a processor, a first number of persons who are actively using a second number of input devices to interact with the interactive video content, wherein the first number is detected independently of the second number;
   and
   determining an advertising charge for the advertisement based on the first number of persons detected.

7. The method of claim 6, further comprising detecting a third number of persons exclusive of the first number of persons, said third number of persons viewing the presentation without using any of the input devices to interact with the interactive video content, and wherein the advertising charge is determined based on a sum of the first number of persons and the third number of persons.

8. A system for monetizing interactive video content presented with one or more advertisements, comprising,
   one or more display devices;
   a connection to each of the display devices arranged to permit the display of interactive video content thereon to one or more persons;
   at least one server, the server arranged for providing advertisements to the display devices for inclusion within the interactive video content;
   one or more participant detectors, the participant detectors being arranged so as to collectively detect a first number of persons who are actively using a second number of input devices to interact with the interactive video content, wherein the first number is detected independently of the second number, and to detect a third number persons who are inactively exposed to the interactive video content exclusive of the first number of persons;
   an accessible memory, the accessible memory being connected to the participant detectors so as to store information about the first and third numbers of persons who are exposed to the interactive video content; and,
   a software executable arranged to interact with the accessible memory and operable to determine an appropriate charge for the advertisements displayed in the interactive video content based on the first and third numbers of persons exposed thereto.

9. The system for monetizing advertisements presented in the display of interactive video content of claim 8, further comprising selecting the advertisements in the interactive video content in response to the first number or third number of persons being exposed to the interactive video content.

10. The system for monetizing advertisements presented in the display of interactive video content of claim 9, further comprising selecting the advertisements in the interactive video content in response to the first number of persons actively exposed to the interactive video content, exclusive of the third number of persons.

* * * * *